United States Patent
Ben Horin

(10) Patent No.: US 9,334,666 B1
(45) Date of Patent: May 10, 2016

(54) TENSION CONVERSION DEVICE AND METHOD

(71) Applicant: Yosi Ben Horin, Thornhill (CA)

(72) Inventor: Yosi Ben Horin, Thornhill (CA)

(*) Notice: Subject to any disclaimer, the term of this patent is extended or adjusted under 35 U.S.C. 154(b) by 0 days.

(21) Appl. No.: 14/611,236

(22) Filed: Jan. 31, 2015

(51) Int. Cl.
*E04H 12/20* (2006.01)
*E04H 12/00* (2006.01)
*F16G 11/02* (2006.01)

(52) U.S. Cl.
CPC .............. *E04H 12/20* (2013.01); *E04H 12/00* (2013.01); *F16G 11/02* (2013.01); *F16G 11/025* (2013.01)

(58) Field of Classification Search
CPC ......... E04H 12/20; E04H 12/16; E04H 12/00; F16G 11/00; F16G 11/02; F16G 11/025; E02D 5/00
USPC .............. 51/148, 149, 150, 151, 146; 52/148, 52/149, 150, 151, 146
See application file for complete search history.

(56) References Cited

U.S. PATENT DOCUMENTS

| | | | | |
|---|---|---|---|---|
| 1,258,140 A * | 3/1918 | Pleister | ................ | F16G 11/00 403/209 |
| 2,376,037 A * | 5/1945 | Davies | .................. | G01L 5/06 73/862.42 |
| 2,665,128 A * | 1/1954 | Guffey | .................. | B60D 1/182 213/32 C |
| 2,861,332 A * | 11/1958 | Hayden | ................ | E04H 12/20 254/29 R |
| 3,049,194 A * | 8/1962 | Brendel | ................ | F16G 11/12 174/40 TD |
| 3,402,518 A * | 9/1968 | Lettunich | ............ | E04H 12/20 52/149 |
| 3,504,460 A * | 4/1970 | Solberg | ................ | F16G 11/00 188/376 |
| 3,611,651 A * | 10/1971 | Carlson | ................ | A01K 3/00 403/373 |
| 4,011,694 A * | 3/1977 | Langford | ............ | E04H 12/20 52/1 |
| 4,407,600 A * | 10/1983 | Thompson | ............ | B63B 15/02 114/109 |
| 4,509,303 A * | 4/1985 | Randle | ................ | E04H 12/20 188/375 |
| 4,565,038 A * | 1/1986 | Milbright | ............ | E04H 12/20 174/43 |
| 5,750,894 A | 5/1998 | Russell et al. | | |
| 7,313,975 B1 * | 1/2008 | Scorteanu | ............ | G01L 5/103 254/257 |
| 7,478,563 B2 * | 1/2009 | Weisman | ............ | G01L 5/042 73/786 |
| 7,823,466 B2 | 11/2010 | Glass | | |
| 8,800,380 B2 | 8/2014 | Todd | | |
| 8,881,471 B1 * | 11/2014 | Theobald | ............ | H01Q 1/1242 52/1 |
| 8,919,051 B1 * | 12/2014 | Echemendia | .......... | F03D 11/04 343/874 |
| 8,950,124 B2 * | 2/2015 | Wellershoff | ............ | E04B 1/98 248/548 |
| 2010/0008734 A1 * | 1/2010 | Stevens | ................ | E04H 12/20 405/244 |
| 2012/0234954 A1 * | 9/2012 | Pereira | ................ | B65H 59/40 242/148 |

FOREIGN PATENT DOCUMENTS

| | | | | |
|---|---|---|---|---|
| DE | 3610743 A1 * | 10/1987 | .............. | H01Q 1/16 |
| DE | 10309825 A1 * | 9/2004 | .............. | E04H 12/20 |
| GB | 2055481 A * | 3/1981 | .............. | E04H 12/20 |

* cited by examiner

*Primary Examiner* — Brian Glessner
*Assistant Examiner* — Babajide Demuren
(74) *Attorney, Agent, or Firm* — Christopher Pilling

(57) ABSTRACT

A method comprising steps for (a) providing a tower, the tower comprising a guy wire having a tension force, wherein the guy wire is anchored to a ground and connected to the tower; and (b) placing a device on the guy wire, at a location between the ground and the tower, wherein the guy wire is discontinued while passing through the device creating a first guy wire and a second guy wire, the device converts the tension force into a compression force, and the tension is calculated from the compression force.

5 Claims, 5 Drawing Sheets

TENSION CONVERSION DEVICE AND METHOD

CROSS-REFERENCE TO RELATED APPLICATIONS

N/A

BACKGROUND OF THE INVENTION

1. Field of the Invention

The present invention generally relates to a tension conversion device and method, and more particularly to a tension conversion device and method for measuring the tension in a guy wire on a guyed tower.

2. Description of Related Art

Tall towers, or guyed towers are supported by cables that are anchored to the ground called guy wires. Guy wires are located on all the sides of the towers supporting the towers and preventing the towers from damage, deflection, and possible failure under high winds.

In the art of measuring tension in a guy wire on a guyed tower, many different techniques and processes are available. Setting and adjusting the tension in a guy wire to maintain a desired level is critical, as improper tension could result in failure. One problem and disadvantage with existing processes is the accuracy of measuring the tension. Most processes measure the tension in a guy wire directly or indirectly.

Glass, U.S. Pat. No. 7,823,466 discloses a device for measuring a tension force in a cable, wire, or rope system. The device includes a first portion for measuring a system force at a first end of the device and including a measurement means, a second portion for adjusting or setting the system force at a second end of the device and including an adjustment means, a housing, where the first portion corresponds to the first end of the housing and the second portion corresponds to the second end of the housing, a resilient means within the measurement means, for generating a resistance force, and, a visual means for indicating an amount of the system force that is related to the physical position of the adjustment means and the resistance force created by the resilient means.

Russell et al., U.S. Pat. No. 5,750,894 discloses a method of determining the tension in a guy wire using natural frequency of vibration. The first fifteen natural frequencies of vibration for the flexible member at the design tension are calculated, as well as the first fifteen natural frequencies at tensions above and below the design value. The actual natural frequencies of the member are then measured with an accelerometer and FFT signal analyzer. Each actual natural frequency is compared to the corresponding calculated natural frequency at various tensions until the tension is found which provides the best match between the actual and calculated values for that natural frequency. Since each actual natural frequency can correspond to the calculated values, with interpolation, at a slightly different value of tension, the base tension for the guy wire is determined as the average of the tensions determined from each actual natural frequency.

The disadvantages to the aforementioned tension measuring device and method are accuracy and complication. Consequently, there is a need for a tension measuring device and method to simply and accurately determine the tension in a guy wire.

BRIEF SUMMARY OF THE INVENTION

In one embodiment of the present invention a method is provided, comprising steps (a) providing a tower, the tower comprising a guy wire having a tension force, wherein the guy wire is anchored to a ground and connected to the tower; and (b) placing a device on the guy wire, at a location between the ground and the tower, wherein the guy wire is discontinued while passing through the device creating a first guy wire and a second guy wire.

In one embodiment, in step (b), the location is close to the ground. In one embodiment, in step (b), the device converts the tension force into a compression force. In one embodiment, the tension force is calculated from the measured compression force.

In another aspect of the invention a device is provided, comprising a first rigid member, a second rigid member, a first guy wire, and a second guy wire, wherein the first guy wire is anchored to the first rigid member and the second wire is anchored to the second rigid member, a compression member is affixed between the first rigid member and the second rigid member, and the first guy wire is connected to a tower, the second guy wire is anchored to a ground.

In one embodiment, the first guy wire and the second guy wire are in tension such that: the first rigid member and the second rigid member are forced in a direction towards each other, wherein the compression member is compressed at a compression value.

DETAILED DESCRIPTION OF THE INVENTION

Figure 1:
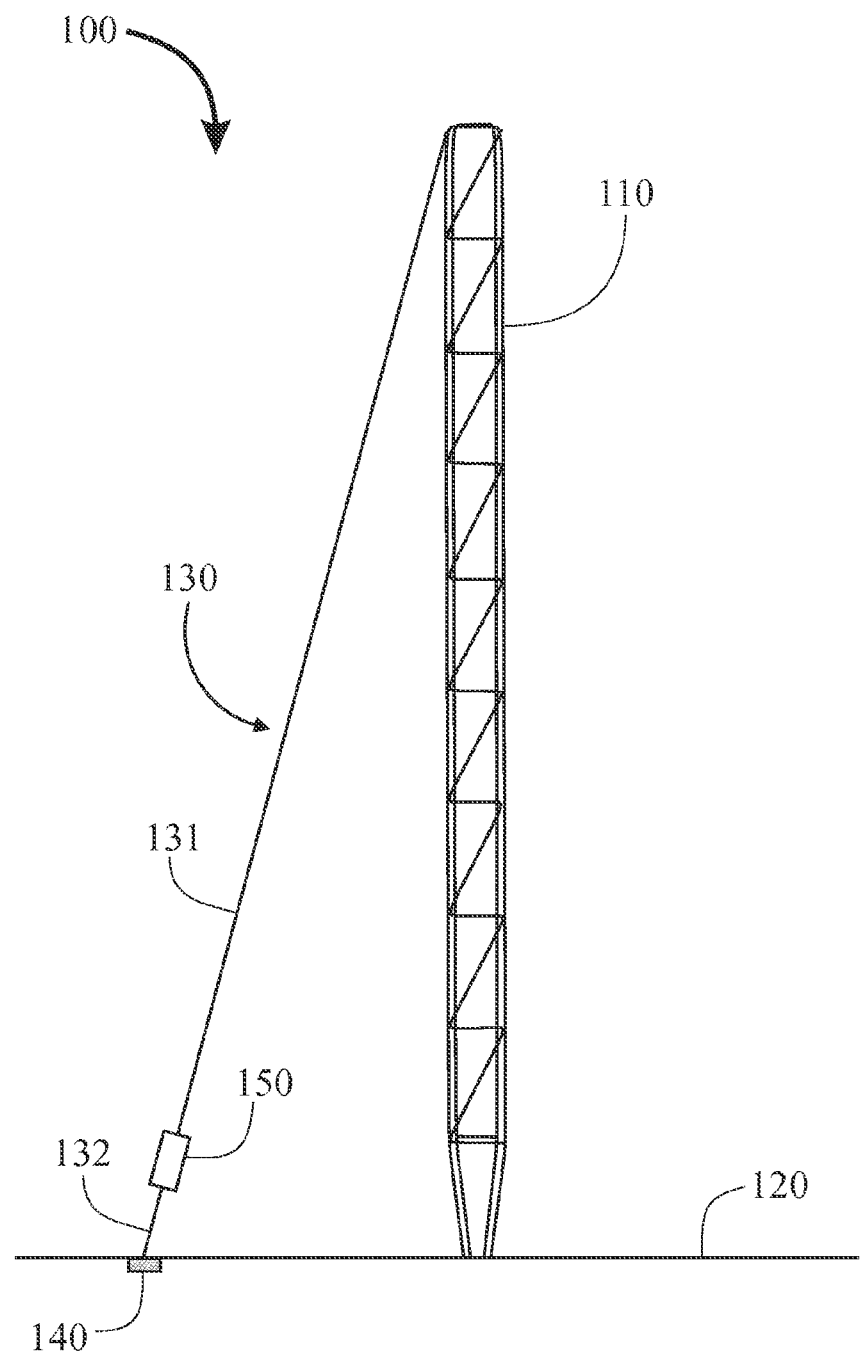
FIG. 1 is a perspective view illustrating a system in which a tension conversion device is installed on a guyed tower according to an embodiment of the present invention.

FIG. 1 is a perspective view illustrating a system 100 in which a hydraulic tension conversion device 150 is installed on a guyed tower according to an embodiment of the present invention. Referring to FIG. 1, the system comprises a guyed tower 110 constructed on a solid ground 120. The guyed tower includes a guy wire 130 anchored to the ground using anchor 140 and connected to the guy tower as well known in the art. The system further includes a tension conversion device 150 located on the guy wire between the ground and the guy tower, preferably at a location close to the ground allowing the device to be more accessible. The guy wire 130 is discontinued while passing through the tension conversion device creating a first guy wire 131 and a second guy wire 132. Both the first and second guy wire is in tension. The operation of the tension conversion device will be described in detail below. Although one guy wire is shown, it is understood that a plurality of guy wires may be included, each having a tension conversion device installed.

Figure 2:
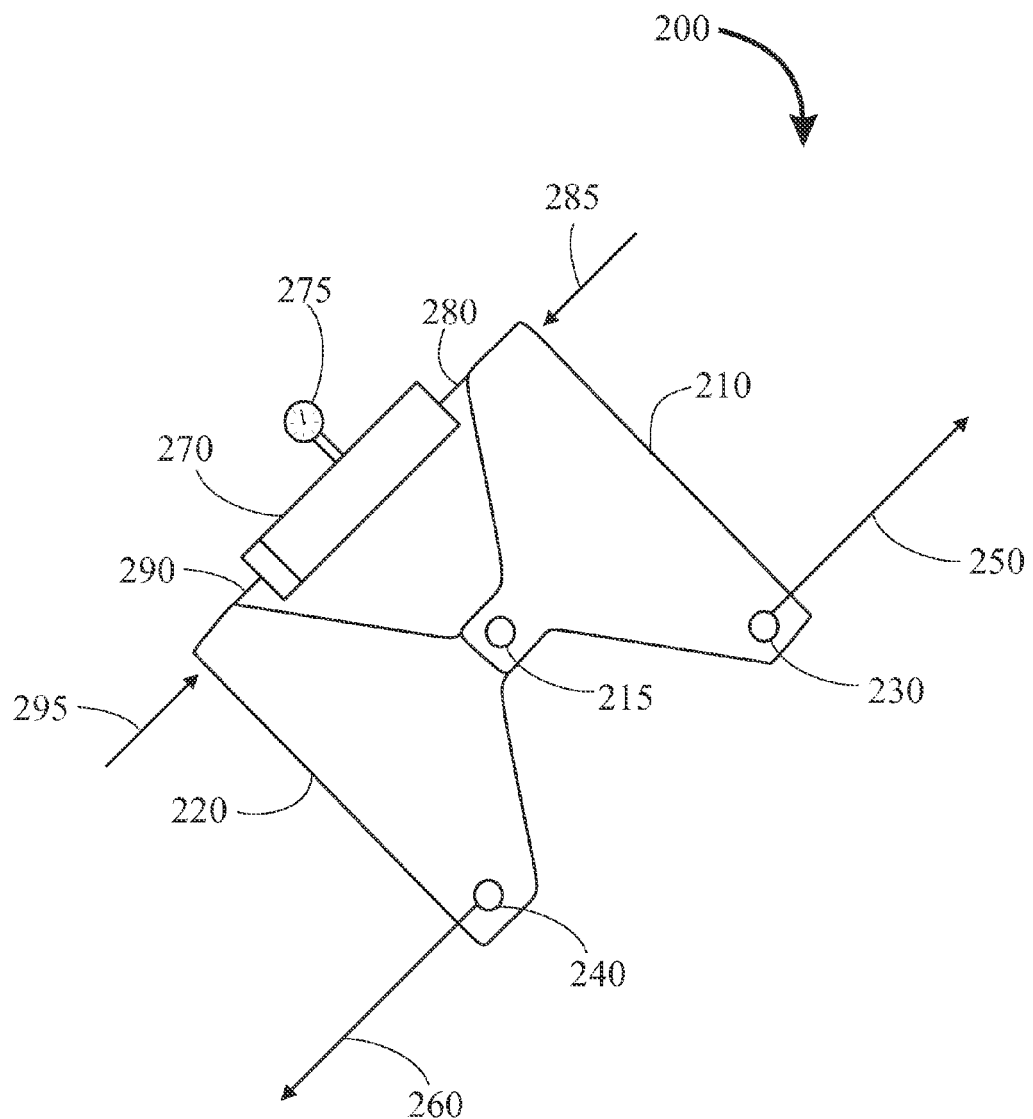
FIG. 2 illustrates an example of a tension conversion device according to an embodiment of the present invention.

FIG. 2 illustrates an example of a tension conversion device 200 according to an embodiment of the present invention. Referring to FIG. 2, the tension conversion device comprises wing shaped plates 210/220 attached at hinge 215. The plates are constructed from a strong alloy, preferably steel. Plate 210 includes an aperture 230, in which a first guy wire 250 is tied to, or connected to the aperture in any method known in the art. The first guy wire is connected to the tower, as seen in FIG. 1. Likewise, plate 220 includes an aperture 240, in which a second guy wire 260 is tied to, or connected to the aperture in any method known in the art. The second guy wire is anchored to the ground, as seen in FIG. 1. Both the first and second guy wire is in tension.

Still referring to FIG. 2, the tension conversion device further comprises a hydraulic cylinder 270 and a compression gauge 275, the cylinder is filled with a hydraulic fluid, such as oil. The hydraulic fluid is under compression from piston rods 280/290. Rod 280 is attached to plate 210 on the opposite side in relation to aperture 230. Likewise, rod 290 is attached to plate 220 on the opposite side in relation to aperture 240.

In operation, the tension in the first and second guy wires cause the winged shaped plates to rotate on hinge and force the corresponding rods in direction 285 and direction 295 respectively. The rods compress the hydraulic fluid which can be measured with the compression gauge. Once the compression is measured the tension in the guy wire (FIG. 1) can be calculated.

Figure 3A:
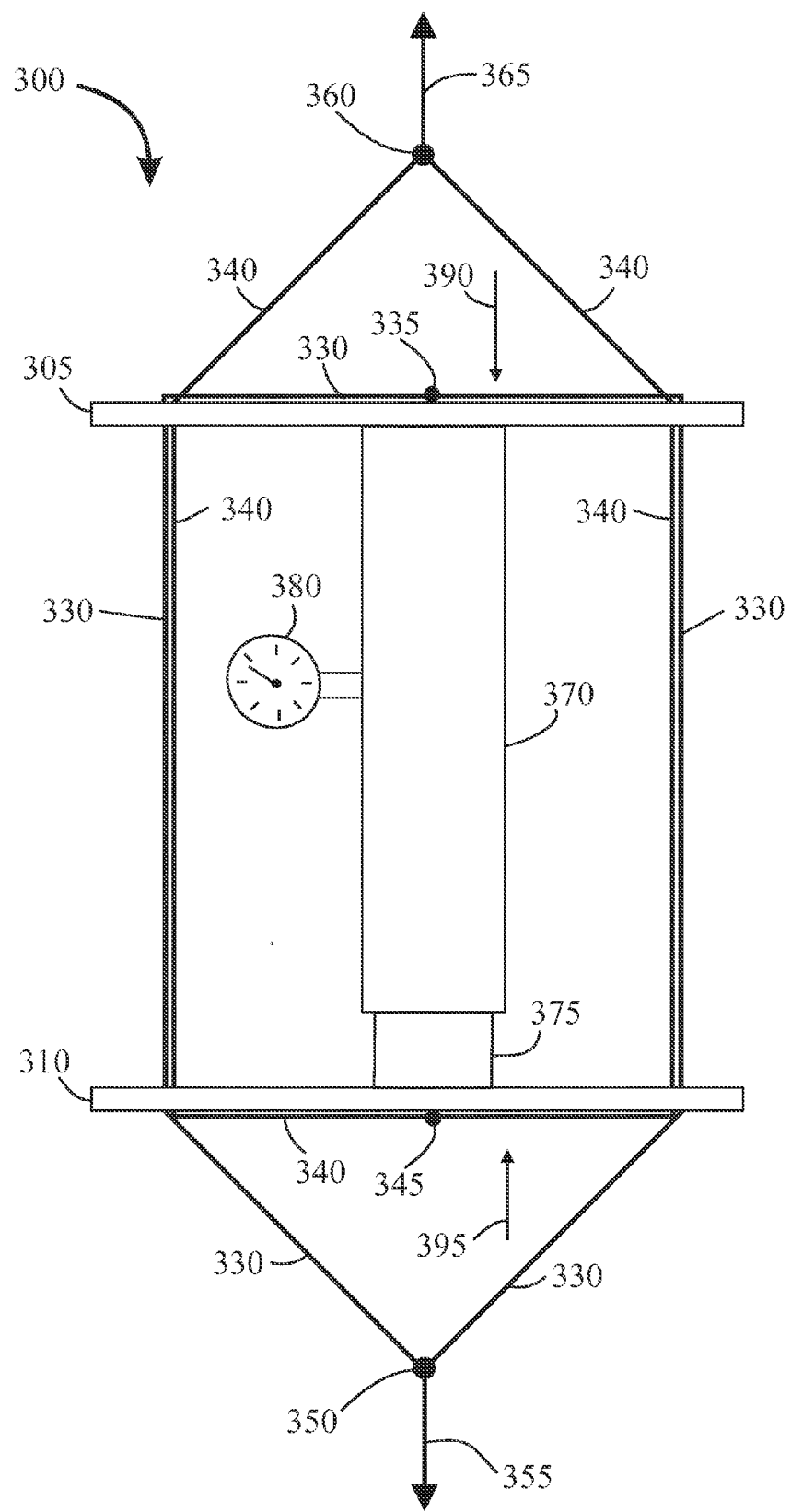
FIG. 3a illustrates an example of a tension conversion device according to an embodiment of the present invention.

FIG. 3a illustrates an example of a tension conversion device 300 according to an embodiment of the present invention. The tension conversion device comprises a hydraulic cylinder 370, and a compression gauge 380. The hydraulic cylinder includes a piston rod 375, and the hydraulic cylinder is filled with a hydraulic fluid, preferably oil. The hydraulic cylinder is located between two rectangular plates 305/310. The rectangular plates are constructed from a strong alloy, preferably steel.

Figure 3B:
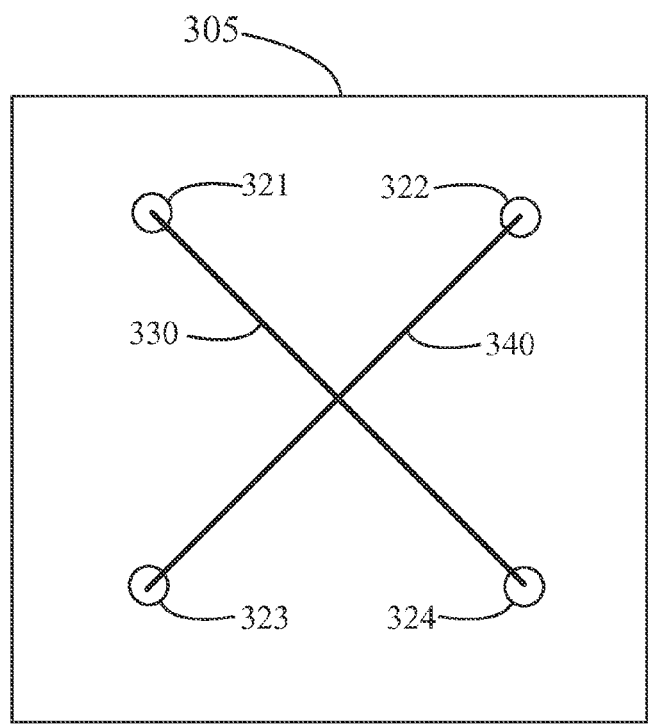
FIG. 3b is a top view of the tension conversion device of FIG. 3a according to an embodiment of the present invention.
Figure 3C:
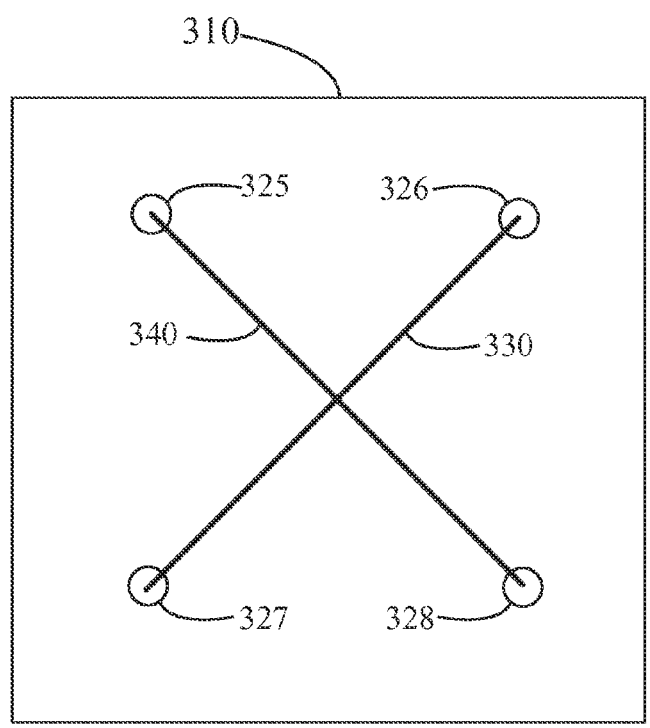
FIG. 3c is a bottom view of a tension conversion device of FIG. 3a according to an embodiment of the present invention.

Rectangular plate 310 includes a cable anchor 345 anchoring cable 340 to the plate. Cable 340 runs tangent to the outside of the rectangular plate 310, then passes through the plate using apertures 325/328 (FIG. 3c). Next, cable 340 passes through rectangular plate 305 via apertures 322/323 (FIG. 3c), and attaches to a first guy wire 365 with attachment means 360. Similarly, rectangular plate 305 includes a cable anchor 335 anchoring cable 330 to the plate. Cable 330 runs tangent to the outside of the rectangular plate 305, then passes through the plate using apertures 321/324 (FIG. 3b). Next, cable 330 passes through rectangular plate 310 via apertures 326/327 (FIG. 3c), and attaches to a second guy wire 355 with attachment means 350. The first guy wire 365 is attached to the tower, as seen in FIG. 1. The second guy wire 355 is anchored to the ground, as seen in FIG. 1.

In operation, the tension in the first and second guy wires cause the plates to be forced towards each other as shown by direction 390 and direction 395. This force pushes the piston rod to compress the hydraulic fluid which can be measured with the compression gauge. Once the compression is measured the tension in the guy wire (FIG. 1) can be calculated.

FIGS. 3b and 3c are top and bottom views of the tension conversion device of FIG. 3a according to an embodiment of the present invention. FIG. 3b is a top view showing rectangular plate 305, with apertures 321-324 for cables 330/340. FIG. 3c is a bottom view showing rectangular plate 310, with apertures 325-328 for cables 330/340. The cables which are tangent to both plates are crossed, to prevent any momentum force on the hydraulic cylinder (FIG. 3a).

Figure 4:
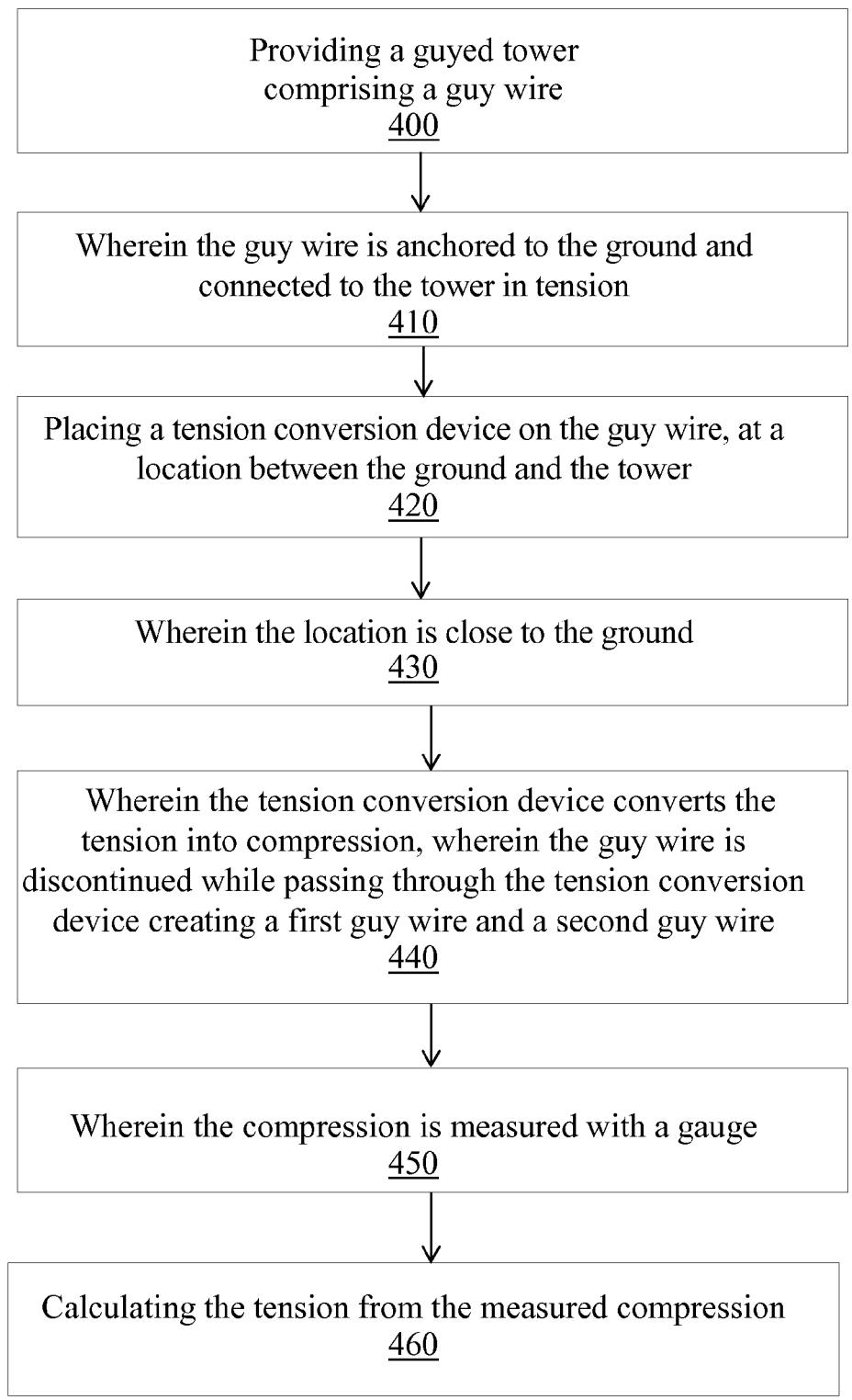
FIG. 4 illustrates a flowchart of a method of a tension conversion device according to an embodiment of the present invention.

FIG. 4 illustrates a flowchart of a method of a tension conversion device according to an embodiment of the present invention. In operation 400, a guyed tower comprising a guy wire is provided. In operation 410, the guy wire is anchored to the ground and connected to the tower in tension. In operation 420, a tension conversion device is placed on the guy wire, at a location between the ground and the tower. In operation 430, the location of the tension conversion device is close to the ground, allowing the device to be more accessible. In operation 440, the tension conversion device converts the tension into compression. That is, the device, such as tension conversion devices (FIG. 2, FIG. 3a) converts the tension in the guy wire into compression. In operation 450, the compression is measured with a gauge. In operation 460, the tension is calculated from the measured compression, as recorded from the gauge.

It will be apparent to the skilled person that there may be many alterations in the embodiments described without departing from the scope of the invention. For example, although hydraulic cylinder systems are shown to measure compression, other methods can be used to measure the compression, such as using materials that change their electric conductivity when a force is applied, or a compression spring as the hydraulic cylinder systems are only shown as an example.

What is claimed is:

1. A method comprising steps:
   (a) providing a tower, the tower comprising a guy wire having a tension force, wherein the guy wire is anchored to a ground and connected to the tower; and
   (b) placing a device on the guy wire, at a location between the ground and the tower, the device comprising a pair of winged shaped elements jointly attached by a hinge, each of the pair of winged shaped members having a first end and second end, wherein the guy wire is attached to the first ends such that the guy wire is discontinued while passing through the device creating a first guy wire and a second guy wire, the first and second guy wire applying the tension force on the first ends such that the pair of winged shaped elements rotate about the hinge forcing the first ends away from each other and the second ends toward each other; the device further comprising a compression gauge attached to the second ends, wherein the device converts the tension force into a compression force, the compression force readily visible on the compression gauge.

2. The method of claim 1 wherein in step (b), the location is close to the ground.

3. The method of claim 1, wherein the tension force is calculated from the compression force.

4. A method comprising steps:
   (a) providing a tower, the tower comprising a guy wire having a tension force, wherein the guy wire is anchored to a ground and connected to the tower; and
   (b) placing a device on the guy wire, at a location between the ground and the tower, the device comprising a first rigid member and a second rigid member constructed from steel; wherein the guy wire is attached to each rigid member such that the guy wire is discontinued while passing through the device creating a first guy wire and a second guy wire, wherein the first guy wire is anchored to the first rigid member via a first cable and the second wire is anchored to the second rigid member via a second cable, the first cable passing through a first pair of apertures located on the second rigid member, and the second cable passing through a second pair of apertures located on the first rigid member; a compression member is affixed between the first rigid member and the second rigid member, the first guy wire and the second guy wire applying the tension force such that: the first rigid member and the second rigid member are forced in a direction towards each other, wherein the compression member is compressed at a compression value readily visible on a compression gauge.

5. A device comprising:

a pair of winged shaped elements jointly attached by a hinge, each of the pair of winged shaped members having a first end and second end;

a tower comprising a guy wire having a tension force, wherein the guy wire is anchored to a ground and connected to the tower; wherein the guy wire is attached to the first ends such that the guy wire is discontinued while passing through the device creating a first guy wire and a second guy wire, the first and second guy wire applying the tension force on the first ends such that the pair of winged shaped elements rotate about the hinge forcing the first ends away from each other and the second ends toward each other; the device further comprising a compression gauge attached to the second ends, wherein the device converts the tension force into a compression force, the compression force readily visible on the compression gauge.

* * * * *